United States Patent
Kaneda et al.

(10) Patent No.: US 8,538,091 B2
(45) Date of Patent: Sep. 17, 2013

(54) IMAGE PROCESSING APPARATUS AND METHOD, AND STORAGE MEDIUM

(75) Inventors: Yuji Kaneda, Kawasaki (JP); Katsuhiko Mori, Kawasaki (JP); Hiroshi Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1213 days.

(21) Appl. No.: 12/147,123

(22) Filed: Jun. 26, 2008

(65) Prior Publication Data

US 2009/0003709 A1    Jan. 1, 2009

(30) Foreign Application Priority Data

Jun. 29, 2007   (JP) ................................. 2007-173112

(51) Int. Cl.
*G06K 9/00*    (2006.01)

(52) U.S. Cl.
USPC .. 382/118; 382/190; 348/222.1; 348/205.024

(58) Field of Classification Search
USPC ................ 382/118, 190; 348/222.1, 205.024
See application file for complete search history.

(56) References Cited

U.S. PATENT DOCUMENTS

| | | | |
|---|---|---|---|
| 5,751,959 A | 5/1998 | Sato et al. | 395/200.35 |
| 5,819,048 A | 10/1998 | Okazaki et al. | 395/200.63 |
| 5,909,543 A | 6/1999 | Tanaka et al. | 395/200.34 |
| 6,243,015 B1 | 6/2001 | Yeo | 340/576 |
| 6,466,685 B1 | 10/2002 | Fukui et al. | 382/115 |
| 6,507,358 B1 | 1/2003 | Mori et al. | 348/42 |
| 6,704,042 B2 | 3/2004 | Matsui et al. | 348/43 |
| 2003/0161504 A1 | 8/2003 | Inoue | 382/115 |
| 2004/0044293 A1 | 3/2004 | Burton | 600/544 |
| 2006/0115157 A1 | 6/2006 | Mori et al. | 382/190 |
| 2006/0222214 A1 | 10/2006 | Kaneda et al. | 382/115 |
| 2007/0025722 A1 | 2/2007 | Matsugu et al. | 396/263 |
| 2008/0181508 A1 | 7/2008 | Kaneda et al. | 382/190 |
| 2009/0135269 A1* | 5/2009 | Nozaki et al. | 348/222.1 |

FOREIGN PATENT DOCUMENTS

| | | |
|---|---|---|
| CN | 1830389 A | 9/2006 |
| EP | 1 700 567 A1 | 9/2006 |
| JP | 6-32154 | 2/1994 |

(Continued)

OTHER PUBLICATIONS

Viola, et al., "Rapid Object Detection Using a Boosted Cascade of Simple Features," Proc. of IEEE Conf. CVPR, 1, pp. 511-518, 2001.

(Continued)

*Primary Examiner* — Ruiping Li
(74) *Attorney, Agent, or Firm* — Fitzpatrick, Cella, Harper & Scinto

(57) ABSTRACT

An image-processing apparatus for executing accurate facial expression recognition even for a subject hard to recognize a facial expression is provided. A person's face region is extracted from an image input from an image input unit. A predetermined partial region that changes between when the facial expression is in the first and second states is extracted from the extracted face region. A facial expression evaluation value is calculated using an evaluation value calculation formula. When the calculated facial expression evaluation value exceeds a threshold value, it is determined that the facial expression is in the second state. If the difference between the maximum value and the minimum value of the calculated facial expression evaluation value within a predetermined time is smaller than a predetermined value, the evaluation value calculation formula or its parameter is changed to increase the difference.

10 Claims, 17 Drawing Sheets

(56) References Cited

FOREIGN PATENT DOCUMENTS

| JP | 7-104778 | 4/1995 |
|----|----------|--------|
| JP | 2962549 | 8/1999 |
| JP | 2000-30065 | 1/2000 |
| JP | 2000-137792 | 5/2000 |
| JP | 2003-323622 | 11/2003 |
| JP | 2005-56388 | 3/2005 |

OTHER PUBLICATIONS

May 21, 2010 Chinese Official Action in Chinese Patent Appln. No. 200810126194.4.
Beat Fasal, "Robust Face Analysis Using Convolutional Neural Networks," IDIAP Research Report, RR 01-48, Dec. 2001, pp. 1-8.
Gloria Chow and Xiabo Li, "Towards a System for Automatic Facial Feature Detection," Pattern Recognition, vol. 26, No. 12, Dec. 1993, pp. 1739-1755.
Matsuga et al., "Subject independent facial expression recognition with robust face detection using a convolution neural network," Neural Networks, Elsevier Science Publishers, Barking, GB, vol. 16, No. 5-6, Jun. 1, 2003, pp. 555-559.
Delakis et al., "Convolution Face Finder: A Neural Architecture for Fast Robust Face Detection," IEEE Transactions on Pattern Analysis and Machine Intelligence, IEEE Service Center, vol. 26, No. 11, Nov. 1, 2004, pp. 1408-1423.
European Search Report dated Aug. 19, 2008, in application No. 08159212.3-2218.

\* cited by examiner

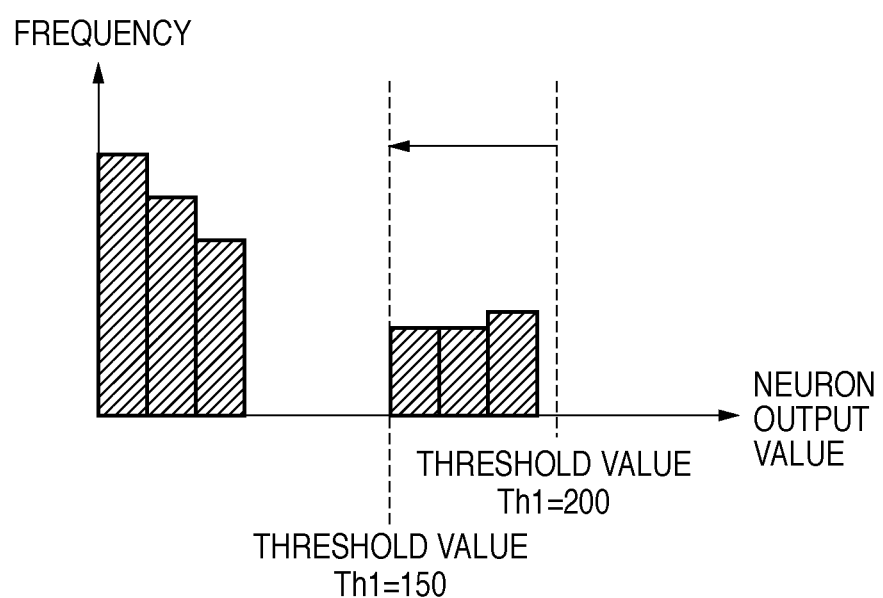
F I G. 14

F I G. 17B
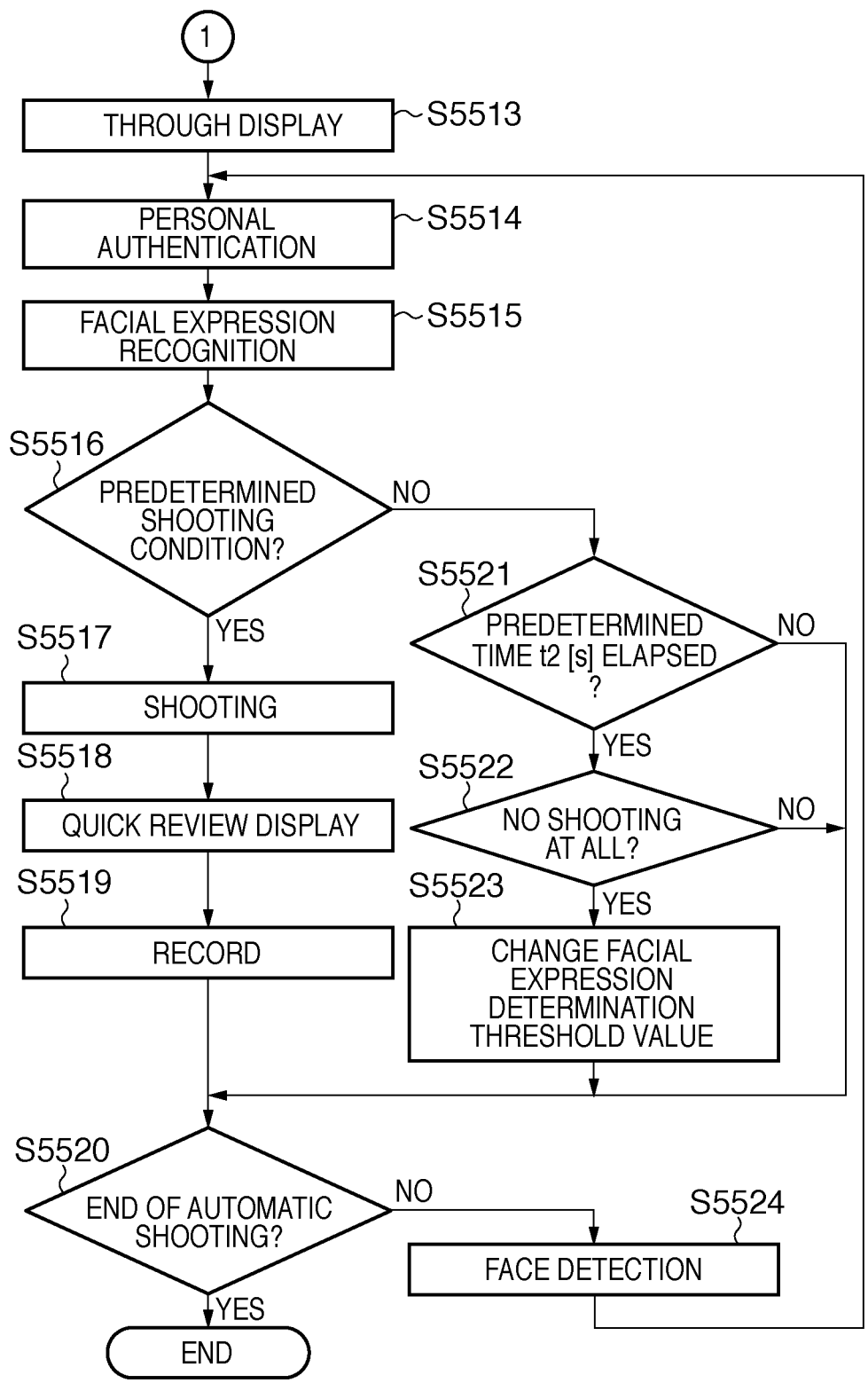

IMAGE PROCESSING APPARATUS AND METHOD, AND STORAGE MEDIUM

BACKGROUND OF THE INVENTION

1. Field of the Invention

The present invention relates to an image processing apparatus and method, and storage medium.

2. Description of the Related Art

A technique for detecting an eye open/closed state that is one of human facial expressions has been developed. For example, a technique, disclosed in reference [1] binarizes an input image, extracts a black region corresponding to a pupil from the binarized image, and determines the eye open/closed state based on the number of vertical continuous pixels of the black region. In this technique, the maximum value of the number of vertical continuous pixels of the black (iris) region is referred to in a plurality of images. Then, a threshold value to be used to determine the presence/absence of a blink is set based on the maximum and minimum values of the number of vertical continuous pixels.

A technique, disclosed in reference [2] detects the edges of upper and lower eyelids and determines the eye open/closed state based on the distance between the upper and lower eyelid edges.

There have also been developed techniques for detecting facial expressions of emotions such as joy and anger. For example, a technique, disclosed in reference [3] executes two-dimensional Fourier transform for an input image and generates a predetermined feature vector. The probability of feature vector generation is calculated from the hidden Markov models of facial expressions prepared in advance. A facial expression corresponding to the hidden Markov model used to calculate the maximum probability is output as a recognition result.

On the other hand, a technique for adjusting a facial expression of an electronic secretary interacting with a user and the degree of the facial expression based on the interacting user, amount of interaction, and situation has also been developed. For example, a technique, disclosed in reference [4] reads out, based on an interacting user, amount of interaction, and situation, a specific expression threshold value from an expression threshold value set stored in advance, or sets an expression threshold value using a specific one of several transformations defined in advance. With this method, the facial expression style of an electronic secretary is set or changed.

However, the shapes and motions of parts such as eyes and mouth included in a face largely change between persons. For example, for a person whose upper and lower eyelids are spaced apart by a relatively long distance, the amount of change in distance between the upper and lower eyelids is large. However, the amount of change in distance between the upper and lower eyelids is small for a person having a short distance between the upper and lower eyelids.

In reference [8] that objectively describes the actions of facial expressions, "joy" that is one of facial expressions is described as (1) "raise cheeks", (2) "pull up lip ends", . . . . However, the amount of change of the cheek or lip end also greatly varies between persons.

For these reasons, if the same parameter (e.g., threshold value) is used for all persons in determining a facial expression, for example, a specific person whose upper and lower eyelids have a short distance may always be determined erroneously to be in an eye closed state. For example, a person who moves the parts such as the eyes and mouth only in a small amount may always be determined erroneously as expressionless.

reference [1] Japanese Patent Laid-Open No. 06-032154
reference [2] Japanese Patent Laid-Open No. 2000-137792
reference [3] Japanese Patent No. 2962549
reference [4] Japanese Patent Laid-Open No. 07-104778
reference [5] Japanese Patent Laid-Open No. 2000-030065
reference [6] Japanese Patent Laid-Open No. 2003-323622
reference [7] Japanese Patent Laid-Open No. 2005-056388
reference [8] P. Ekman and W. V. Friesen, Facial Action Coding System (FACS): Manual, Palo Alto: Consulting Psychologists Press, 1978
reference [9] P. Viola and M. Jones, "Rapid object detection using a Boosted Cascade of Simple Features", Proc. of IEEE Conf. CVPR, 1, pp. 511-518, 2001
reference [10] Yann LeCun and Yoshua Bengio, "Convolutional Networks for Images, Speech, and Time Series", The Handbook of Brain Theory and Neural Networks, pp. 255-258, 1995
reference [11] Ishii, Ueda, Maeda, and Murase, "Easy-to-Understand Pattern Recognition", Ohmsya, 1998

SUMMARY OF THE INVENTION

The present invention has been made in consideration of the above-described problems, and has as its object to accurately recognize even a facial expression of a difficult subject that has difficulty in facial expression recognition processing.

The present invention in one aspect provides an image-processing apparatus for executing accurate facial expression recognition even for a subject hard to recognize a facial expression. A person's face region is extracted from an image input from an image input unit. A predetermined partial region that changes between when the facial expression is in the first and second states is extracted from the extracted face region. A facial expression evaluation value is calculated using an evaluation value calculation formula. When the calculated facial expression evaluation value exceeds a threshold value, it is determined that the facial expression is in the second state. If the difference between the maximum value and the minimum value of the calculated facial expression evaluation value within a predetermined time is smaller than a predetermined value, the evaluation value calculation formula or its parameter is changed to increase the difference.

Further features of the present invention will become apparent from the following description of exemplary embodiments with reference to the attached drawings.

BRIEF DESCRIPTION OF THE DRAWINGS

FIG. 14 is a graph for explaining a change in a threshold value for a neuron output value according to the second embodiment;

FIGS. 17A-B are flowcharts illustrating the operation of the image-capture device according to the third embodiment.

DESCRIPTION OF THE EMBODIMENTS

Preferred embodiments of the present invention will be described in detail in accordance with the accompanying drawings. The present invention is not limited by the disclosure of the embodiments and all combinations of the features described in the embodiments are not always indispensable to solving means of the present invention.

First Embodiment

Figure 1:
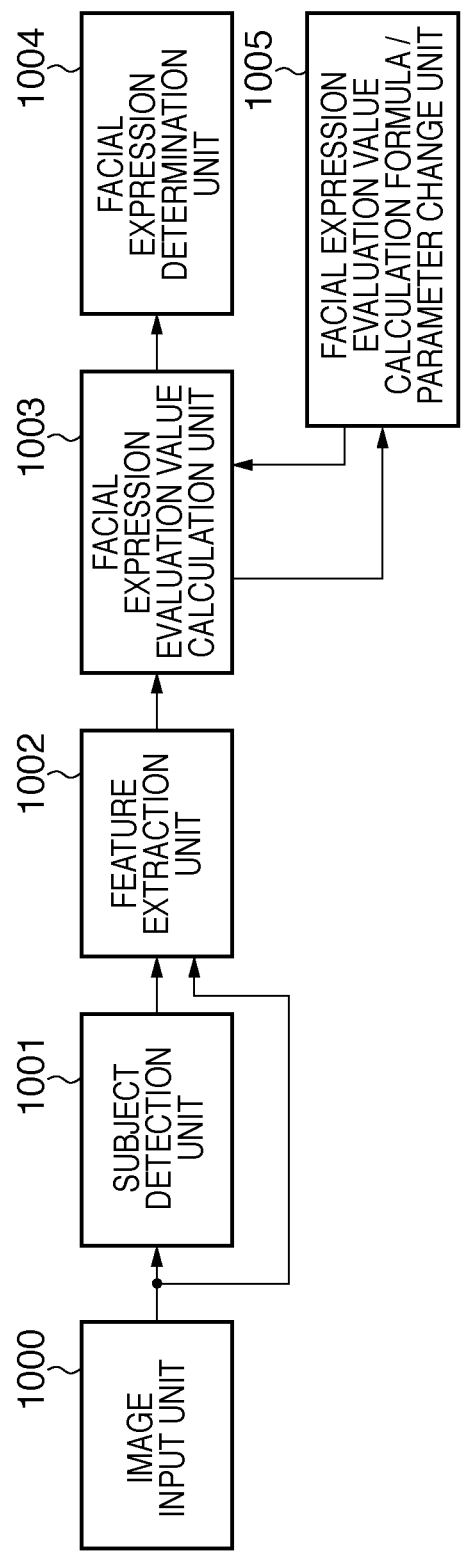
FIG. 1 is a block diagram showing the arrangement of an image-processing apparatus according to the first embodiment.

FIG. 1 is a block diagram showing the arrangement of an image-processing apparatus according to the first embodiment.

An image input unit 1000 inputs an image signal. A subject detection unit 1001 detects the presence/absence of a person's face from the image signal input from the image input unit 1000, and if a face is present, detects its position. A feature-extraction unit 1002 extracts features necessary for facial expression recognition using the person's face position detected by the subject detection unit 1001 and the image generated by the image input unit 1000. A facial expression evaluation value calculation unit 1003 calculates a facial expression evaluation value representing the type of the facial expression of each subject and the degree of each facial expression using the features necessary for facial expression recognition, which are extracted by the feature-extraction unit 1002. A facial expression determination unit 1004 determines the facial expression of each subject using the facial expression evaluation value of the subject, which is calculated by the facial expression evaluation value calculation unit 1003. A facial expression evaluation value calculation formula/parameter change unit 1005 changes the calculation formula or its coefficient for the future facial expression evaluation value based on the facial expression evaluation value calculated by the facial expression evaluation value calculation unit 1003.

This embodiment will be described in detail using, as an example, eye closing that is one of the facial expressions of a person.

Figure 2:
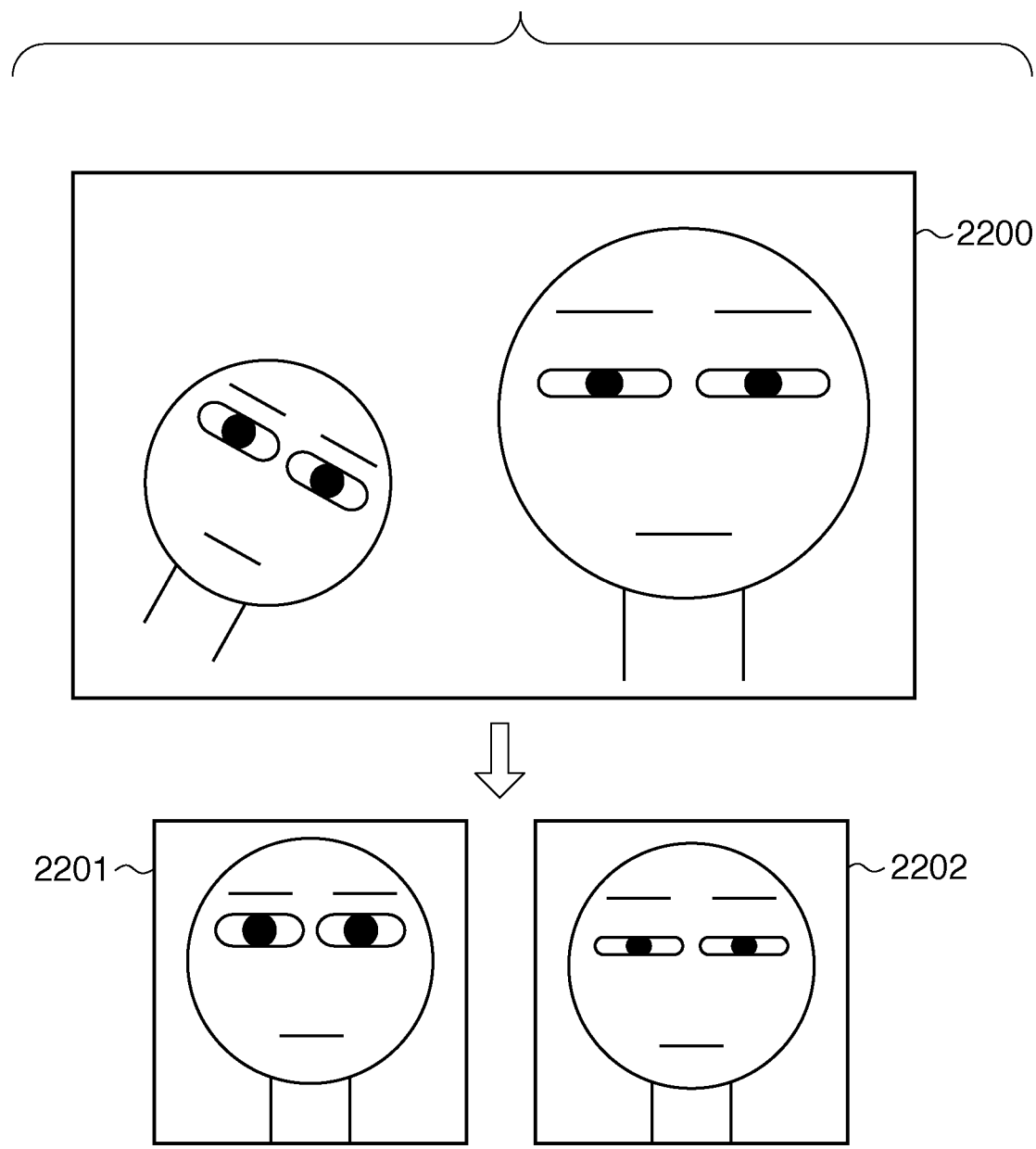
FIG. 2 is a view showing examples of an input image and a normalized image.

The image input unit 1000 inputs an image signal generated by an image-capture device including a lens, an image-capture element such as a CMOS sensor or CCD, an A/D converter, and an image-processing circuit. For example, an image 2200 shown in FIG. 2 is input.

The subject detection unit 1001 extracts the position of a person's face region from the image signal input from the image input unit 1000. To do this, the subject detection unit 1001 uses, for example, a technique of detecting a face position using a number of rectangular filters and a technology called Integral Image (see reference [9]). The types of rectangular filters to be used to detect the face position are selected by learning an enormous number of face images and non-face images, which are prepared in advance, using a learning method called AdaBoost.

The subject detection unit 1001 also executes an image normalization process using three points, that is, the face position and the barycentric positions of the left and right eye regions to obtain a face image having a predetermined size and a predetermined orientation. For example, the following method is used to detect the barycentric positions of the left and right eye regions. First, an eye search region including the whites of eyes, eyelids, and pupils is set on the upper side based on the face position of each person. The barycentric positions of eye regions including the whites of left and right eyes, eyelids, and pupils are detected from the set eye search region using the technique disclosed in reference [9], like the above-described face detection. Rectangular filters are selected by learning various kinds of eye pattern images such as images of wide-opened eyes, images with various lines of sight, and images of closed eyes prepared in advance, as in face detection.

It is therefore possible to detect the barycentric positions of regions including whites of eyes, eyelids, and pupils not in an eye open state but also in an eye closed state. After the face position and the barycentric positions of the left and right eye regions are detected, the face region of each person is cut from the image 2200 input by the image input unit 1000, as shown in FIG. 2. Affine transform is performed to obtain normalized images 2201 and 2202 in FIG. 2 which have a predetermined size and a predetermined orientation. For example, a face region is extracted from an input image having a size of 720×480 [pixel]. A normalized image which is viewed from the front side and has a size of 100×100 [pixel] is obtained while setting the distance between the barycentric positions of the left and right eye regions to 40 [pixels].

When the size of a person's face in the input image is small (for example, when the distance between the barycentric positions of the left and right eye regions is 20 [pixel] or less), or the face orientation falls outside a predetermined range (for example, 30° or more from the front that is set at 0°), the process is inhibited.

The feature-extraction unit 1002 extracts a pupil region as a partial region using the barycentric positions of the left and right eye regions detected by the subject detection unit 1001. To detect the pupil region, first, a pupil search region is set for each of the left and right eye regions based on their barycentric positions detected by the subject detection unit 1001. An image is cut from each set pupil search region and submitted to a convolutional neural network (see reference [10]; to be referred to as a CNN hereinafter) which has completed learning in advance.

Figure 3:
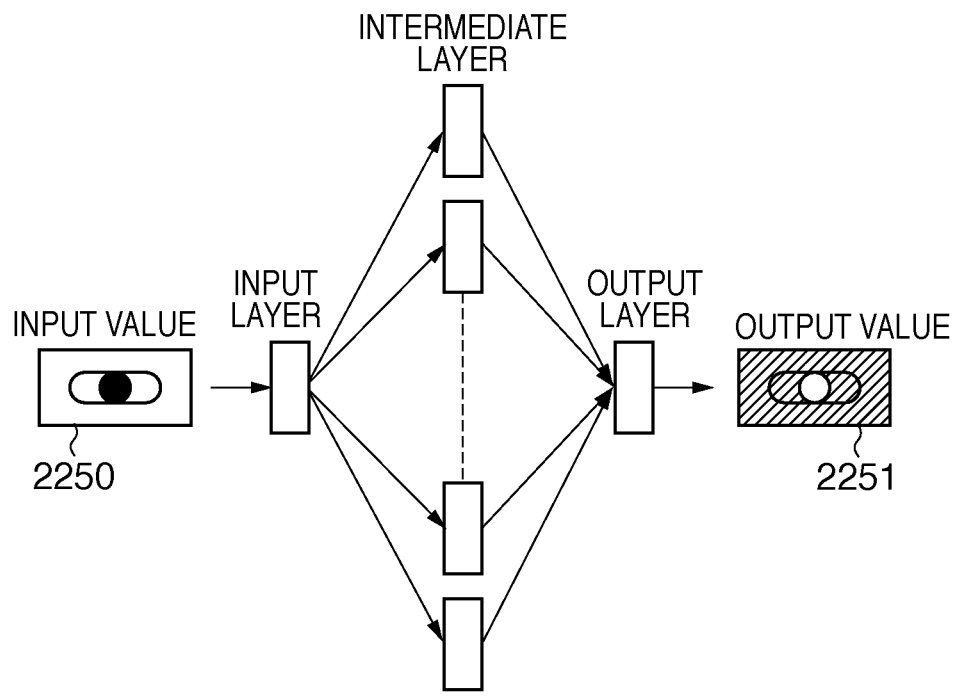
FIG. 3 is a view for explaining a convolutional neural network (CNN) for detecting a pupil region.

The CNN used in this embodiment has a three-layer structure including an input layer, intermediate layer, and output layer, as shown in FIG. 3. For learning, an enormous number of correct images representing a pupil peripheral region in an eye open state (first state) and non-correct images representing a pupil peripheral region in an eye closed state (second state) are prepared.

Next, the weighting coefficients between the features in the neural network are adjusted so that when a correct image 2250 is input to the input layer, as shown in FIG. 3, a neuron value corresponding to a pupil region output from the output layer becomes large, as in an output value image 2251 in FIG. 3. More specifically, the weighing coefficients are changed using a steepest decent method (see reference [11]). The weighing coefficients are adjusted such that when a non-correct image is input, conversely, a neuron value corresponding to a pupil region output from the output layer becomes small.

This learning is repeated. Then, when an image of an open eye is input, as shown in FIG. 3, only the output value of a neuron region corresponding to a pupil region becomes large in the output layer while the values of the remaining portions are small. Note that one neuron output value corresponds to one pixel of the image.

In this embodiment, a CNN having a three-layer structure is used, as shown in FIG. 3. However, the present invention is not limited to this. A feature corresponding to a pupil region may be detected using a technique other than the CNN.

Figure 4:
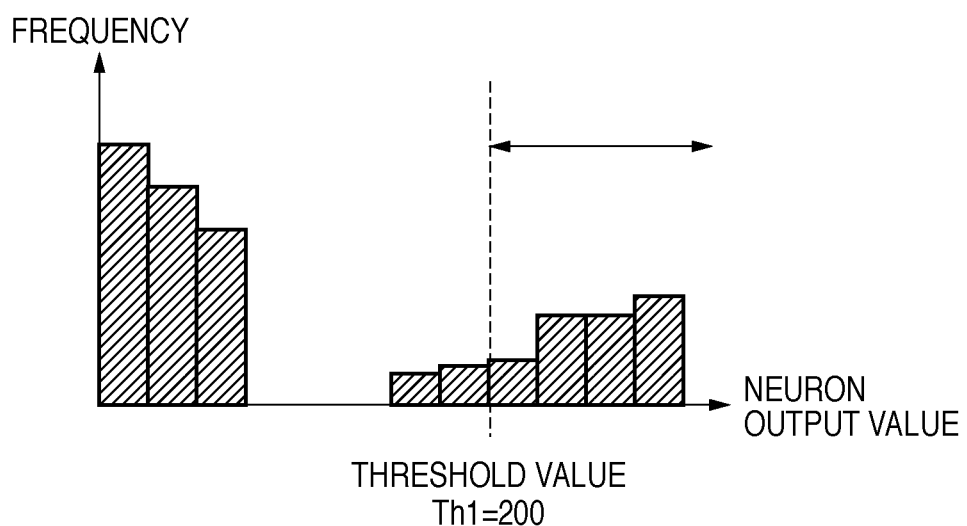
FIG. 4 is a graph showing an example of a neuron output value histogram of the CNN.
Figure 5:
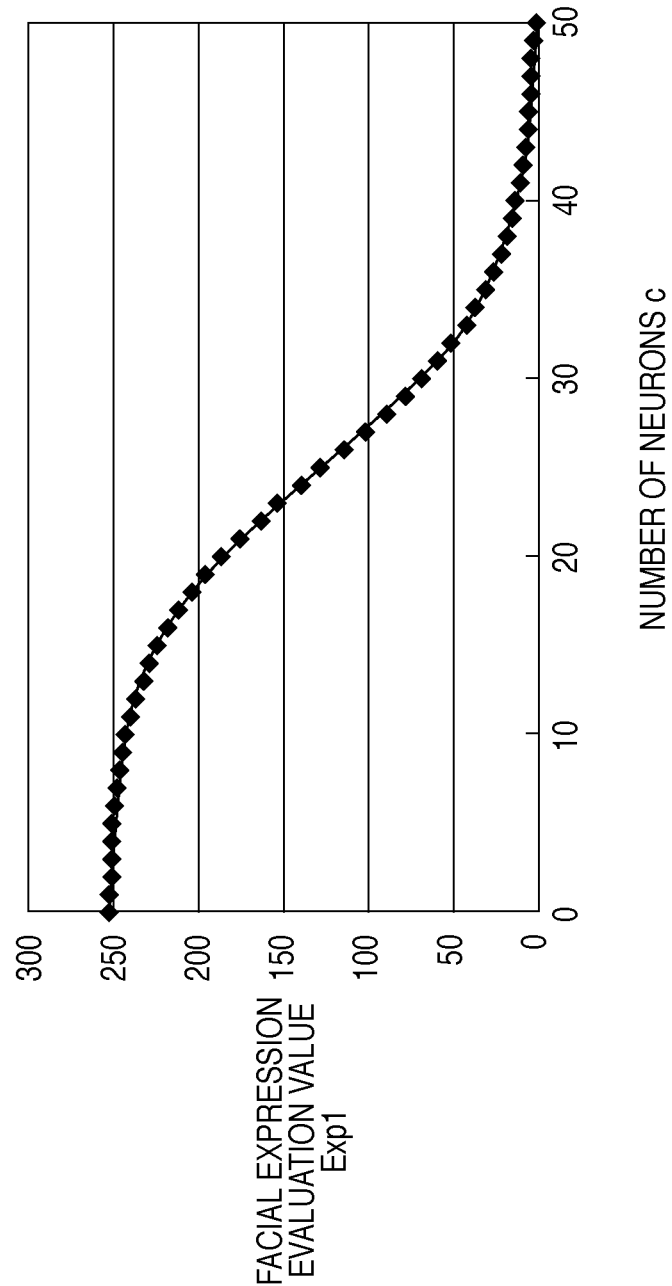
FIG. 5 is a graph showing the characteristic of a facial expression evaluation value.

The facial expression evaluation value calculation unit 1003 compares the neuron output value corresponding to the pupil region extracted by the feature-extraction unit 1002 with a threshold value Th1. The number c of neuron output values equal to or larger than the threshold value Th1 is counted. A facial expression evaluation value Exp1 representing the degree of eye closing is calculated using the number c. For example, when the neuron output values extracted by the feature-extraction unit 1002 are distributed from 0 to 255, the threshold value Th1 is set to, for example, 200, as shown in FIG. 4, and the number c of the neuron output values equal to or larger than the threshold value Th1 is counted. The facial expression evaluation value Exp1 (0 to 255) is calculated using a facial expression evaluation value calculation formula representing the characteristic shown in FIG. 5. The larger the facial expression evaluation value Exp1 is, the higher the possibility of eye closing is. FIG. 5 shows the relationship between the facial expression evaluation and the number of neuron output values equal to or larger than the threshold value Th1 in the neuron output values of the pixels of a pupil region. The facial expression evaluation value characteristic can be represented by, for example, a hyperbolic tangent function. More specifically, the facial expression evaluation value calculation formula is given by $$Exp1 = A0(\tan h(-B0*(c-C0)) + D0)$$

where A0, B0, C0, and D0 are constants.

Figure 6:
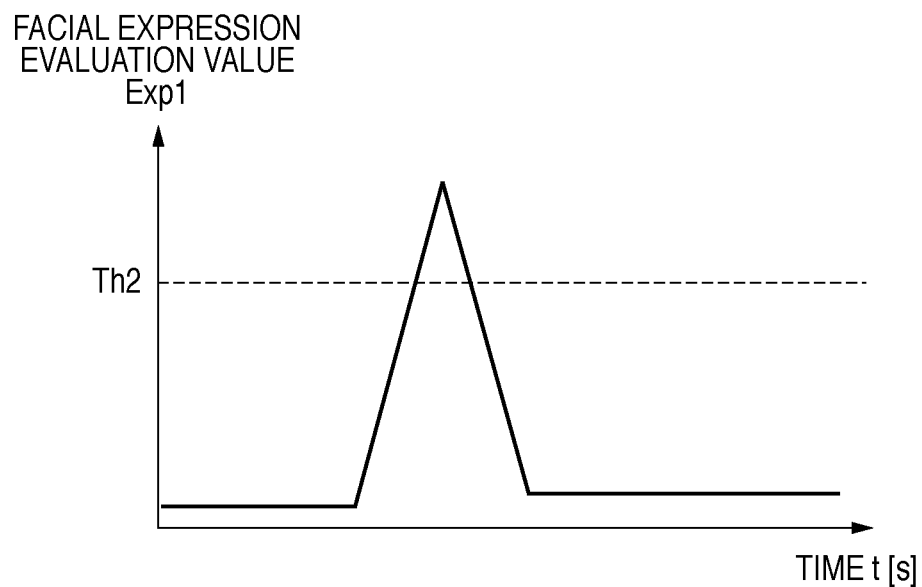
FIG. 6 is a graph for explaining the threshold process of a facial expression evaluation value.

FIG. 6 shows a time series change in the facial expression evaluation value Exp1 during the period of a person's blink. As shown in FIG. 6, when the eye is open, the facial expression evaluation value Exp1 is small. When the eye closes, the facial expression evaluation value increases. When the eye opens again, the facial expression evaluation value Exp1 returns to the small value. The facial expression determination unit 1004 executes binary determination to determine whether the eye is closed or open by comparing the facial expression evaluation value Exp1 representing the degree of eye closing with a threshold value Th2. The threshold value Th2 is set to, for example, 210. If the facial expression evaluation value is equal to or smaller than the threshold value Th2, that is, $Exp1 \leq 210$, the facial expression determination unit 1004 determines that the eye is open (first state). On the other hand, if the facial expression evaluation value is larger than the threshold value Th2, that is, Exp1>210, the facial expression determination unit 1004 determines that the eye is closed (second state).

The facial expression evaluation value calculation formula/parameter change unit 1005 changes the facial expression evaluation value calculation formula or its coefficient so that the maximum value of the facial expression evaluation value Exp1 calculated within a predetermined time t1 [s] becomes 255, and the minimum value becomes 0. In this embodiment, the maximum value is 255, and the minimum value is 0. However, the present invention is not limited to this.

The CNN used by the feature-extraction unit 1002 performs learning to detect a pupil region. Hence, the neuron output value and output region of the CNN become large as a pupil region appears large. For a person whose upper and lower eyelids have an average distance, like 2300 in FIG. 7, the amount of change of the neuron output value and output region of the CNN between the eye closed state and the eye open state is relatively large. Hence, the facial expression evaluation value Exp1 exhibits a time series change as in FIG. 6, and eye closing can correctly be determined based on the threshold value Th2.

Figure 7:
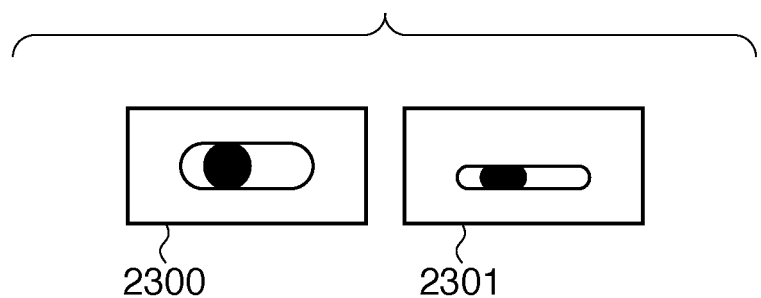
FIG. 7 is a view showing an eye of a person who has a long distance between the upper and lower eyelids and that of a person who has a short distance.
Figure 8:
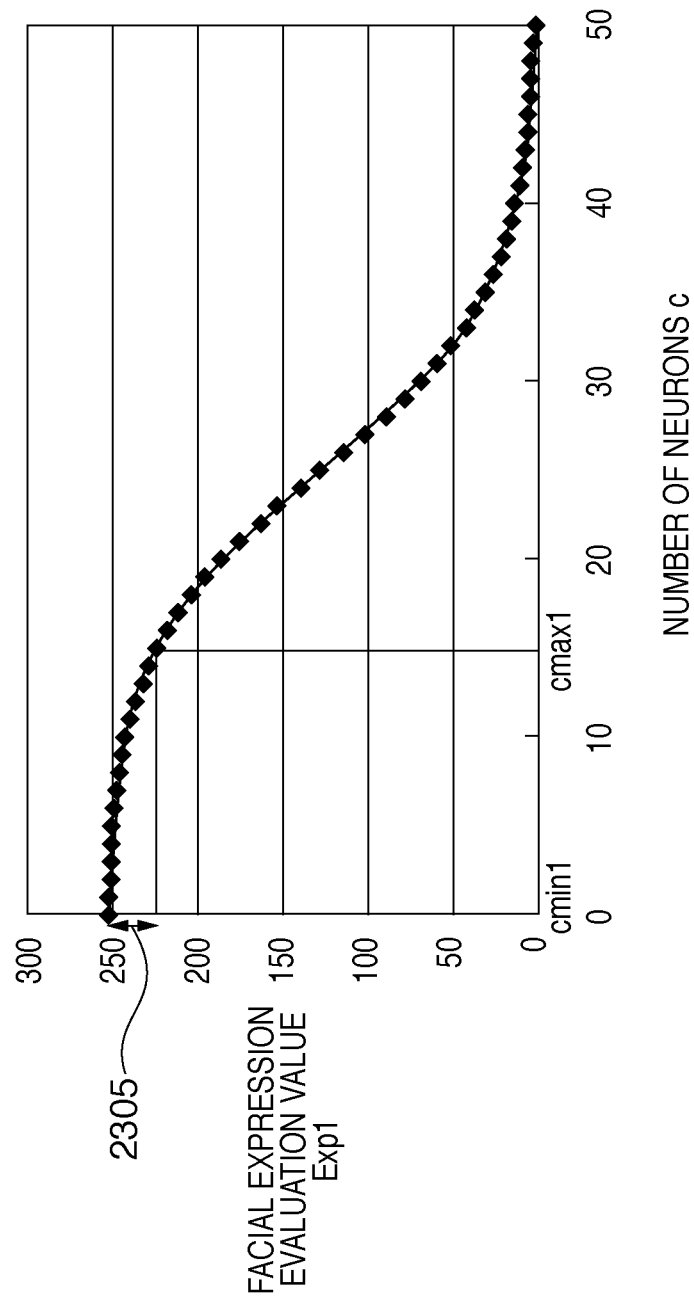
FIGS. 8 and 9 are graphs for explaining an eye closed state detection error.
Figure 9:
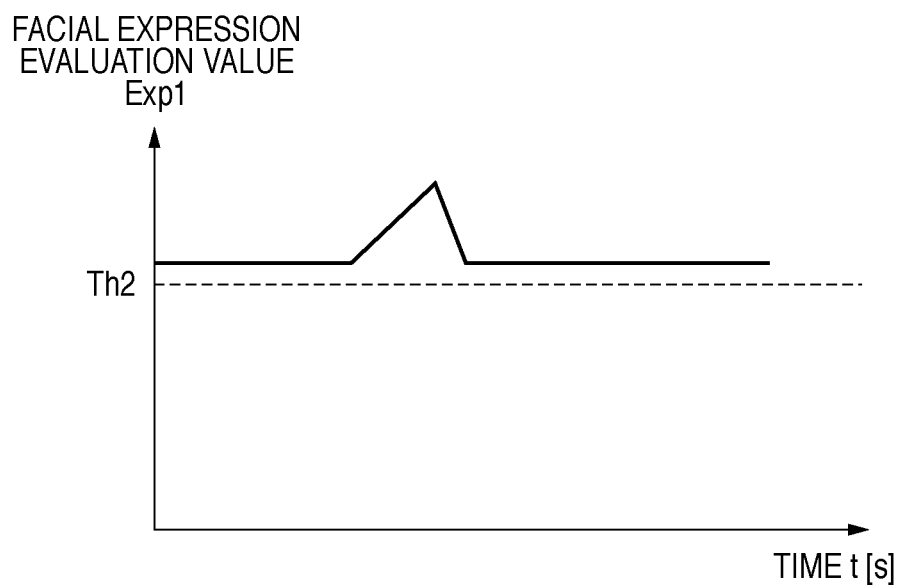

However, for a person who has naturally slit eyes with a short distance between the upper and lower eyelids, like 2301 in FIG. 7, the amount of change of the neuron output value and output region of the CNN between the eye closed state and the eye open state is small. For this reason, the maximum value of the number c of neuron values is cmax1, and the minimum value is cmin1 as in FIG. 8. Accordingly, the facial expression evaluation value Exp1 is calculated only in a narrow range 2305. The facial expression evaluation value Exp1 exhibits a time series change as in FIG. 9. As a result, the person who is not actually closing the eyes is often erroneously detected to be in the eye closed state. This applies not only to determination based on the pupil region area as the detection feature but also to eye closing determination using the distance between the upper and lower eyelids. This also applies not only to a slit-eyed person but also to a person whose pupil region is difficult to detect due to a different pupil color.

If the difference between the maximum value and the minimum value of the facial expression evaluation value Exp1 is smaller than a predetermined value, the facial expression evaluation value calculation formula/parameter change unit 1005 changes the facial expression evaluation value calculation formula or its coefficient to make the difference large. More specifically, the facial expression evaluation value calculation formula/parameter change unit 1005 changes the facial expression evaluation value calculation formula or its coefficient such that, for example, the maximum value of the facial expression evaluation value Exp1 calculated within the predetermined time t1 [s] becomes 255, and the minimum value becomes 0. This enables more accurate detection for a subject hard to determine eye closing. Note that the predetermined time t1 [s] is a time enough for a blink. Generally, a human being blinks once in 3 to 10 sec. For example, predetermined time t1=20 [s] is set.

Figure 10:
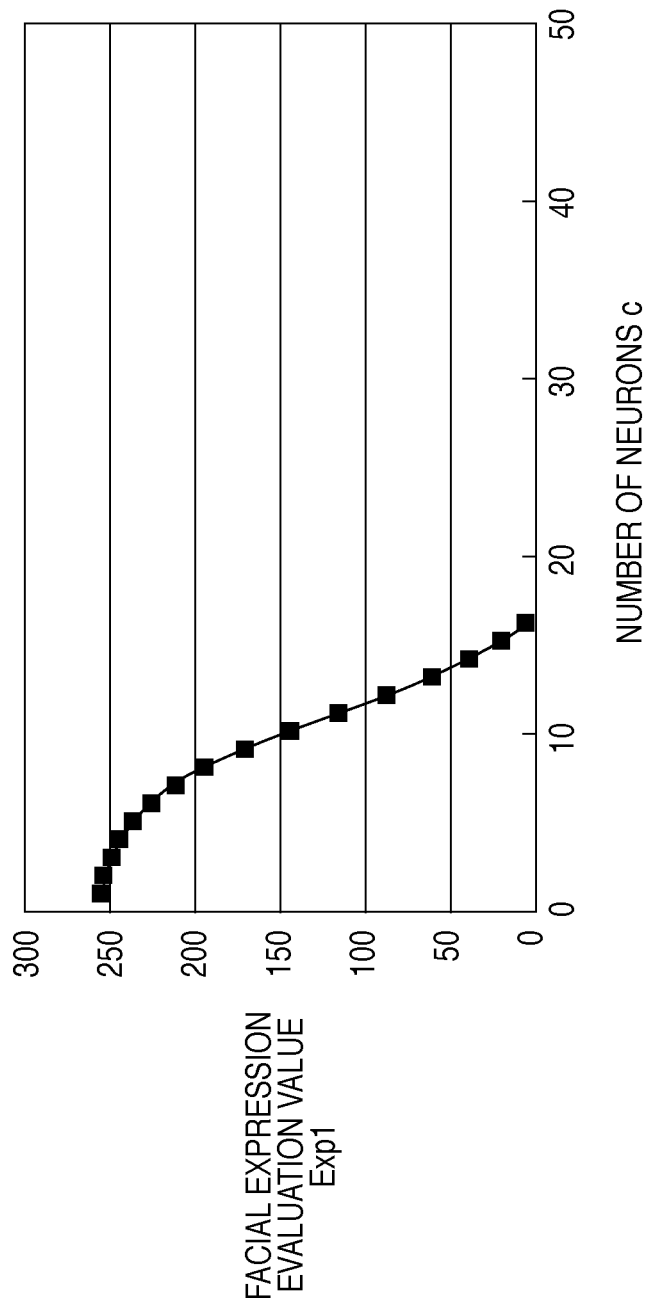
FIG. 10 is a graph showing an example of the facial expression evaluation value characteristic upon changing the coefficient of the facial expression evaluation value calculation formula of the characteristic in FIG. 8.

The coefficient of the facial expression evaluation value calculation formula is changed, for example, in the following way. First, a minimum value Exp1min and a maximum value Exp1max of the facial expression evaluation value Exp1, and a minimum count cmin and a maximum count cmax of the neuron output values are obtained within the predetermined time t1 [s]. Next, the coefficient of the facial expression evaluation value calculation formula is decided using these values and a table prepared in advance to obtain a facial expression evaluation value calculation formula that exhibits, for example, a characteristic shown in FIG. 10.

Figure 11:
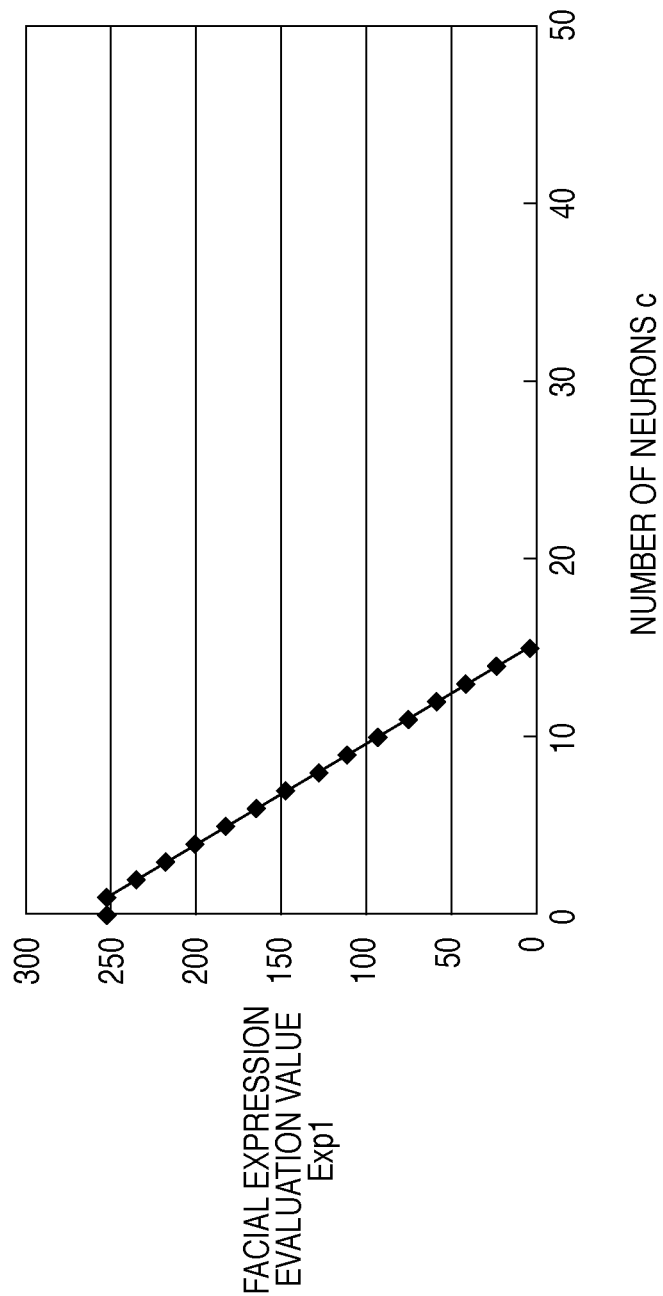
FIG. 11 is a graph showing an example of the facial expression evaluation value characteristic which has a linear characteristic changed from the facial expression evaluation value characteristic in FIG. 8.

Instead of changing the coefficient of the facial expression evaluation value calculation formula, the facial expression evaluation value calculation formula itself may be changed using a linear function as shown in FIG. 11.

Figure 12:
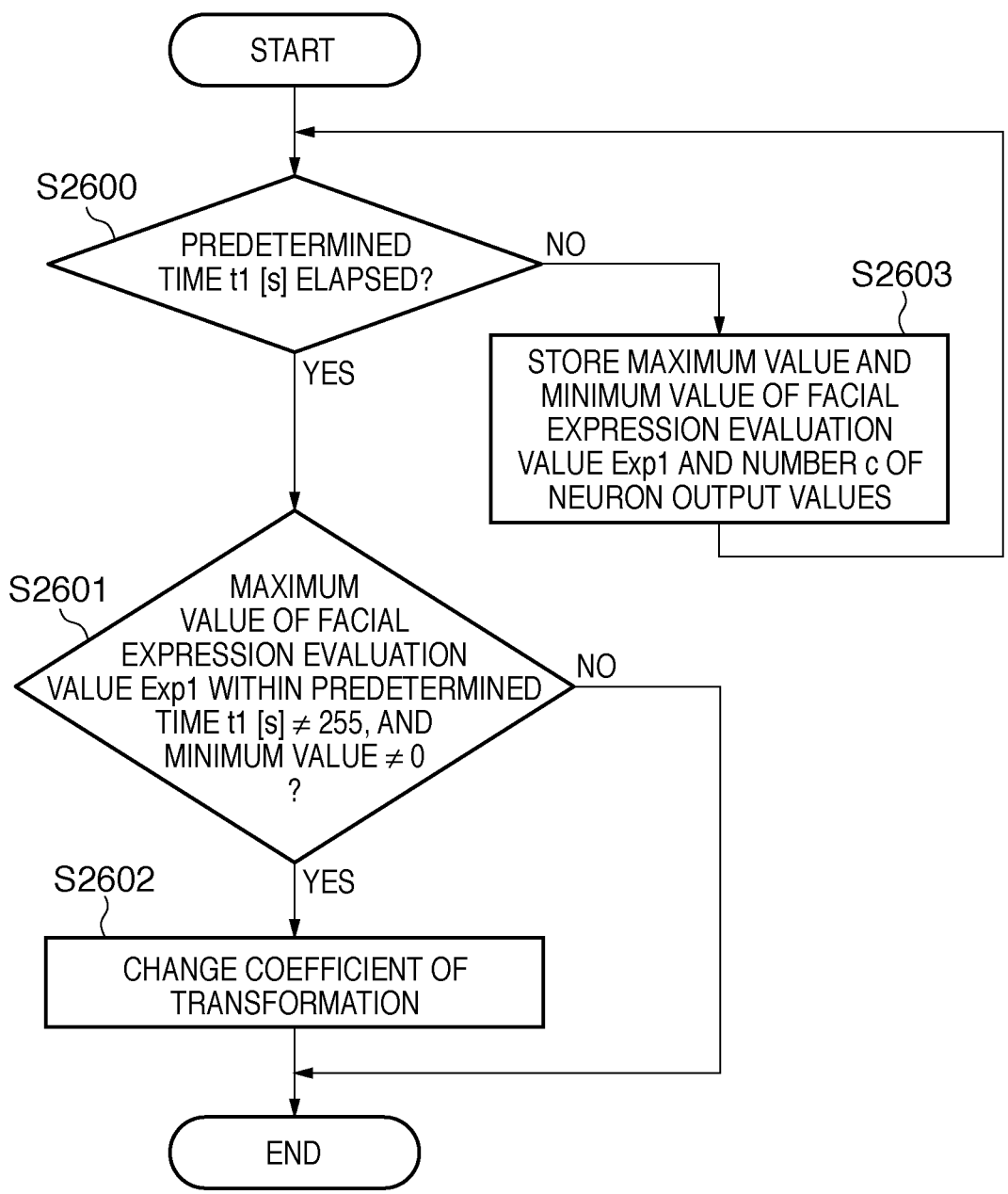
FIG. 12 is a flowchart illustrating a process of changing the coefficient of the facial expression evaluation value calculation formula according to the first embodiment.

FIG. 12 is a flowchart illustrating a process of changing the coefficient of the facial expression evaluation value calculation formula.

In step S2600, it is determined whether the predetermined time t1 [s] set in advance has elapsed. For example, t1=20 [s]. If it is determined in step S2600 that the predetermined time t1 [s] has not elapsed, the process advances to step S2603. In step S2603, the maximum and minimum values of the facial expression evaluation value Exp1, and the number c of neuron output values equal to or larger than the threshold value Th1 are stored, and the process returns to step S2600.

If it is determined in step S2600 that the predetermined time t1 [s] has elapsed, the process advances to step S2601. In step S2601, it is determined whether the maximum value of the facial expression evaluation value Exp1 within the predetermined time t1 [s] is 255, and the minimum value is 0. If it is determined in step S2601 that the maximum value of the facial expression evaluation value Exp1 is not 255, and the minimum value is not 0, the process advances to step S2602.

In step S2602, the coefficient of the facial expression evaluation value calculation formula is changed using a table prepared in advance, and the process is ended. If it is determined in step S2601 that the maximum value of the facial expression evaluation value Exp1 is 255, and the minimum value is 0, the process is directly ended.

The above-described process is preferably executed for each of a plurality of persons.

As described above, the amount of change of the facial expression evaluation value is made large by changing the facial expression evaluation value calculation formula or its coefficient. This allows more accurate detection of eye closing of a difficult subject.

Second Embodiment

Figure 13:
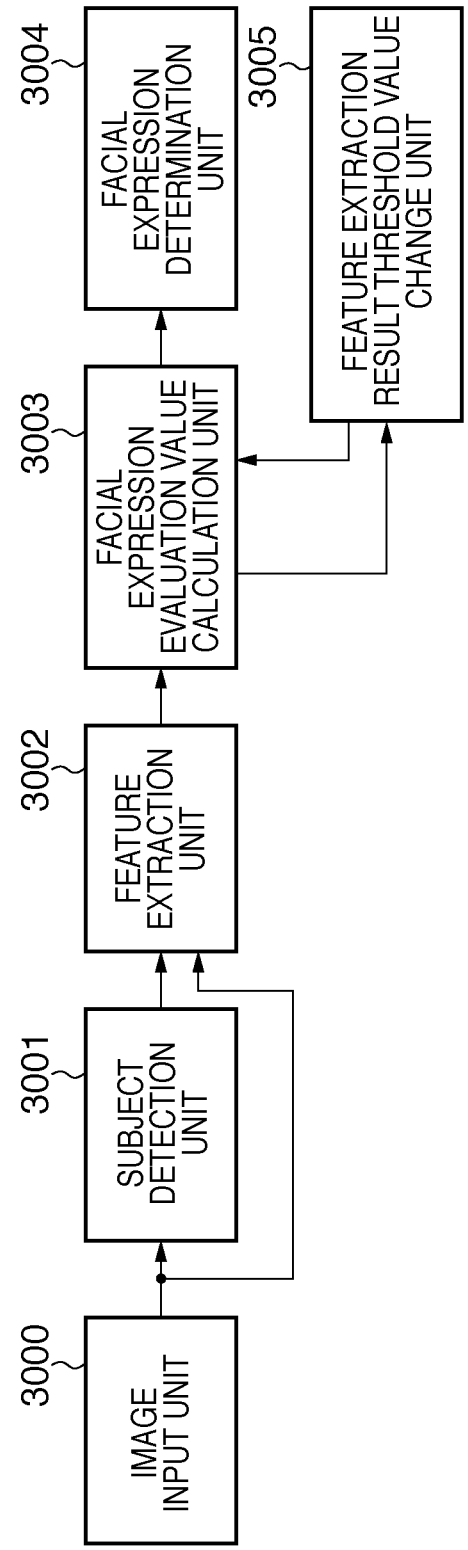
FIG. 13 is a block diagram showing the arrangement of an image-processing apparatus according to the second embodiment.

FIG. 13 is a block diagram showing the arrangement of an image-processing apparatus according to the second embodiment.

An image input unit 3000 inputs an image signal. A subject detection unit 3001 detects the presence/absence of a person's face from the image signal input from the image input unit 3000, and if a face is present, detects its position. A feature-extraction unit 3002 extracts features necessary for facial expression recognition using the person's face position detected by the subject detection unit 3001 and the image generated by the image input unit 3000. A facial expression evaluation value calculation unit 3003 calculates a facial expression evaluation value representing the type of the facial expression of each subject and the degree of each facial expression using the features necessary for facial expression recognition, which are extracted by the feature-extraction unit 3002. A facial expression determination unit 3004 determines the facial expression of each subject using the facial expression evaluation value of the subject, which is calculated by the facial expression evaluation value calculation unit 3003. A feature-extraction result threshold value change unit 3005 changes a threshold value to be used for the feature extracted by the feature-extraction unit 3002 based on the facial expression evaluation value calculated by the facial expression evaluation value calculation unit 3003.

This embodiment will now be described in detail using, as an example, eye closing that is one of the facial expressions of a person, as in the first embodiment.

The image input unit 3000 to the facial expression determination unit 3004 execute the same processes as the image input unit 1000 to the facial expression determination unit 1004 of the first embodiment, and a description thereof will not be repeated.

The feature-extraction result threshold value change unit 3005 changes a threshold value Th1 of the neuron output value of the CNN such that the maximum value of a facial expression evaluation value Exp1 becomes 255, and the minimum value becomes 0, as in the first embodiment. For example, the threshold value Th1 is changed for 200 to 150, as shown in FIG. 14. As has been described in the first embodiment, for a person who has a relatively short distance between the upper and lower eyelids, the pupil region that appears is small, and therefore, the neuron output value obtained from the CNN tends to be small. The threshold value Th1 is set to be small for such a person who obtains a small neuron output value from the CNN in general, like a person who has a relatively short distance between the upper and lower eyelids. As a detailed method of changing the threshold value Th1, a maximum value Numax of the neuron output value within a predetermined time t1 [s] is calculated, and a neuron output value corresponding to maximum value Numax×0.8 is set as the threshold value Th1. For example, when the maximum value of the neuron output value within the predetermined time t1 [s] is 200, the threshold value Th1 is set to 160.

Figure 15:
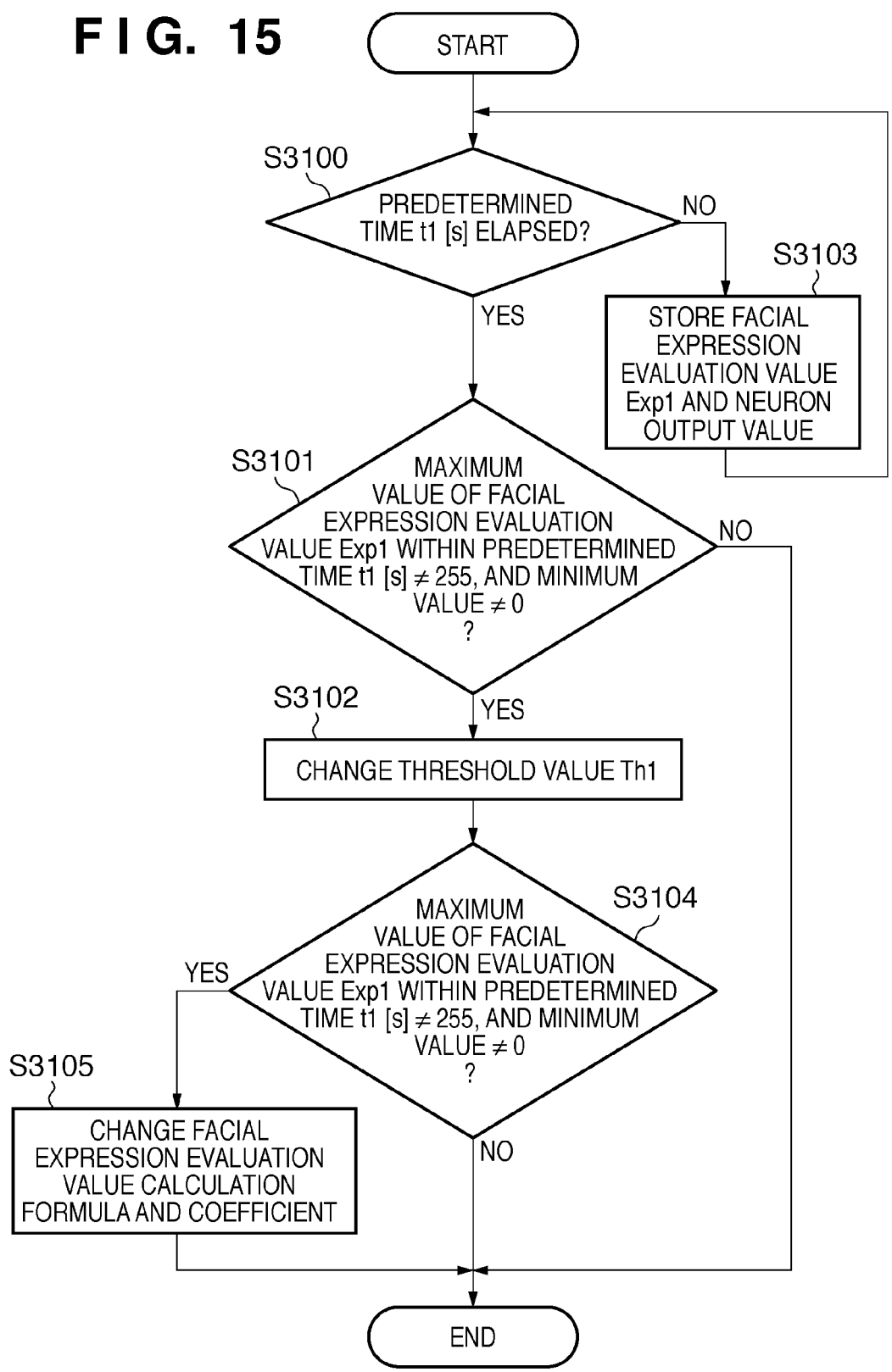
FIG. 15 is a flowchart illustrating a threshold value change process according to the second embodiment.

FIG. 15 is a flowchart illustrating a process of changing the threshold value Th1 of the neuron value output from the output layer of the CNN, the facial expression evaluation value calculation formula, or its coefficient.

In step S3100, it is determined whether the predetermined time t1 [s] has elapsed. If it is determined in step S3100 that the predetermined time t1 [s] has not elapsed, the process advances to step S3103. In step S3103, the facial expression evaluation value Exp1 and the neuron output value output from the CNN are stored. If it is determined in step S3100 that the predetermined time t1 [s] has elapsed, the process advances to step S3101.

In step S3101, it is determined whether the maximum value of the facial expression evaluation value Exp1 within the predetermined time t1 [s] is 255, and the minimum value is 0. If it is determined that the maximum value is not 255, and the minimum value is not 0, the process advances to step S3102. In step S3102, the threshold value Th1 is changed to Th1' by the above-described method. Then, the process advances to step S3104.

In step S3104, the maximum value and minimum value of the facial expression evaluation value Exp1 within the predetermined time t1 [s] are calculated again using the threshold value Th1' changed in step S3102, and it is determined whether the maximum value is 255, and the minimum value is 0. If it is determined in step S3104 that the maximum value of the facial expression evaluation value Exp1 within the predetermined time t1 [s] is not 255, and the minimum value is not 0, the process advances to step S3105.

In step S3105, the facial expression evaluation value calculation formula or its coefficient is changed using the same method as in the first embodiment such that the maximum value of the facial expression evaluation value Exp1 within the predetermined time t1 [s] becomes 255, and the minimum value becomes 0.

If it is determined in step S3101 to S3104 that the maximum value of the facial expression evaluation value Exp1 within the predetermined time t1 [s] is 255, and the minimum value is 0, the process is directly ended.

As described above, the amount of change of the facial expression evaluation value is made large by changing threshold value Th1 of the neuron output value of the CNN. This allows more accurate detection of the eye-closed state of a difficult subject.

Third Embodiment

Figure 16:
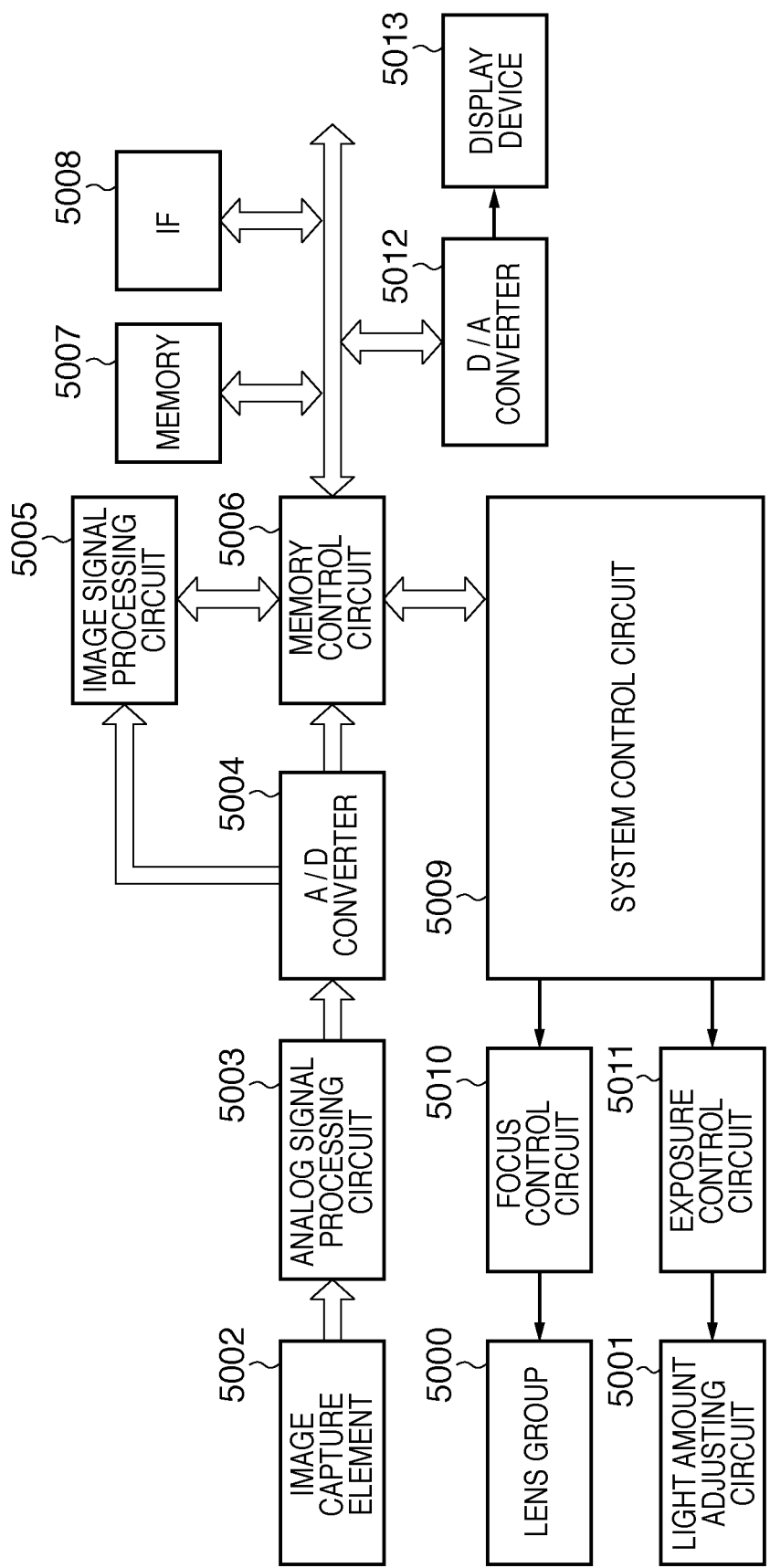
FIG. 16 is a block diagram showing the arrangement of an image-capture device according to the third embodiment.

FIG. 16 is a block diagram showing the arrangement of an image-capture device according to the third embodiment.

Referring to FIG. 16, reference numeral 5000 denotes an image-capture lens group; and 5001, a light amount adjusting device having a stop device and a shutter device. An image-capture element 5002 such as a CCD or CMOS converts a light beam corresponding to a subject image that has passed through the image-capture lens group into an electrical signal.

An analog signal processing circuit 5003 executes clamp processing and gain processing for the analog signal output from the image-capture element 5002. An analog/digital (to be referred to as "A/D" hereinafter) converter 5004 converts the output from the analog signal processing circuit 5003 into a digital signal.

An image signal processing circuit 5005 executes predetermined pixel interpolation processing and color conversion processing for the data from the A/D converter 5004 or data from a memory control circuit 5006. The image signal processing circuit 5005 also performs predetermined arithmetic processing using the captured image data.

A system control circuit 5009 executes TTL-type AF (Auto Focus) processing, AE (Auto Exposure) processing, and EF (Electronic Flash pre-light emission) processing to control an exposure control circuit 5011 and a focus control circuit 5010 based on the arithmetic result.

The image signal processing circuit 5005 also executes predetermined arithmetic processing using the captured image data and executes TTL AWB (Auto White Balance) processing based on the obtained arithmetic result. The image signal processing circuit 5005 also executes person's face detection processing, personal authentication processing, and facial expression recognition processing based on the captured image data. Data to be used for the predetermined image-processing such as face detection processing, personal authentication processing, and facial expression recognition processing are stored in the memory of the image signal processing circuit 5005.

The memory control circuit 5006 controls the analog signal processing circuit 5003, A/D converter 5004, image signal processing circuit 5005, memory 5007, and digital/analog (to be referred to as "D/A" hereinafter) converter 5012. The data A/D-converted by the A/D converter 5004 is written in the memory 5007 via the image signal processing circuit 5005 and the memory control circuit 5006 or directly from the memory control circuit 5006.

The memory 5007 stores data to be displayed on a display device 5013. The data recorded in the memory 5007 is output to and displayed on the display device 5013 such as a TFT or LCD via the D/A converter 5012. The memory 5007 also stores captured still images and moving images. The memory 5007 has a sufficient storage capacity to store a predetermined number of still images or a moving image of a predetermined time. Even in a continuous shooting mode or a panoramic shooting mode in which a plurality of still images are continuously captured, a large quantity of image data can be written in the memory 5007 at a high speed. The memory 5007 also serves as the work area of the system control circuit 5009.

The display device 5013 can implement an electronic viewfinder function by sequentially displaying captured image data. The display device 5013 can arbitrarily turn on/off the display in accordance with an instruction from the system control circuit 5009. In the display OFF state, the power consumption of the image-capture device can largely be reduced as compared to the display ON state. The display device 5013 also displays an operation state or a message using a text or an image in accordance with program execution by the system control circuit 5009.

Reference numeral 5008 denotes an interface to a storage medium such as a memory card or a hard disk. It is possible to transfer image data or management information attached to the image data to or from another computer or a peripheral device such as a printer using the interface 5008. When the interface 5008 complies with a standard such as a PCMCIA card or a CF (Compact Flash®) card, various kinds of communication cards can be connected. Examples of the various communication cards are a LAN card, modem card, USB card, IEEE1394 card, P1284 card, SCSI card, and communication card for a PHS.

The system control circuit 5009 controls the overall image-capture device. The memory of the system control circuit 5009 stores constants, variables, and programs for the operation of the system control circuit 5009.

The exposure control circuit 5011 controls the stop device and shutter device of the light amount adjusting device 5001. The focus control circuit 5010 controls focusing and zooming of the image-capture lens group 5000. The exposure control circuit 5011 and the focus control circuit 5010 are controlled by the TTL method. The system control circuit 5009 controls the exposure control circuit 5011 and the focus control circuit 5010 based on the arithmetic result obtained upon the arithmetic processing of the image data by the image signal processing circuit 5005.

Figure 17A:
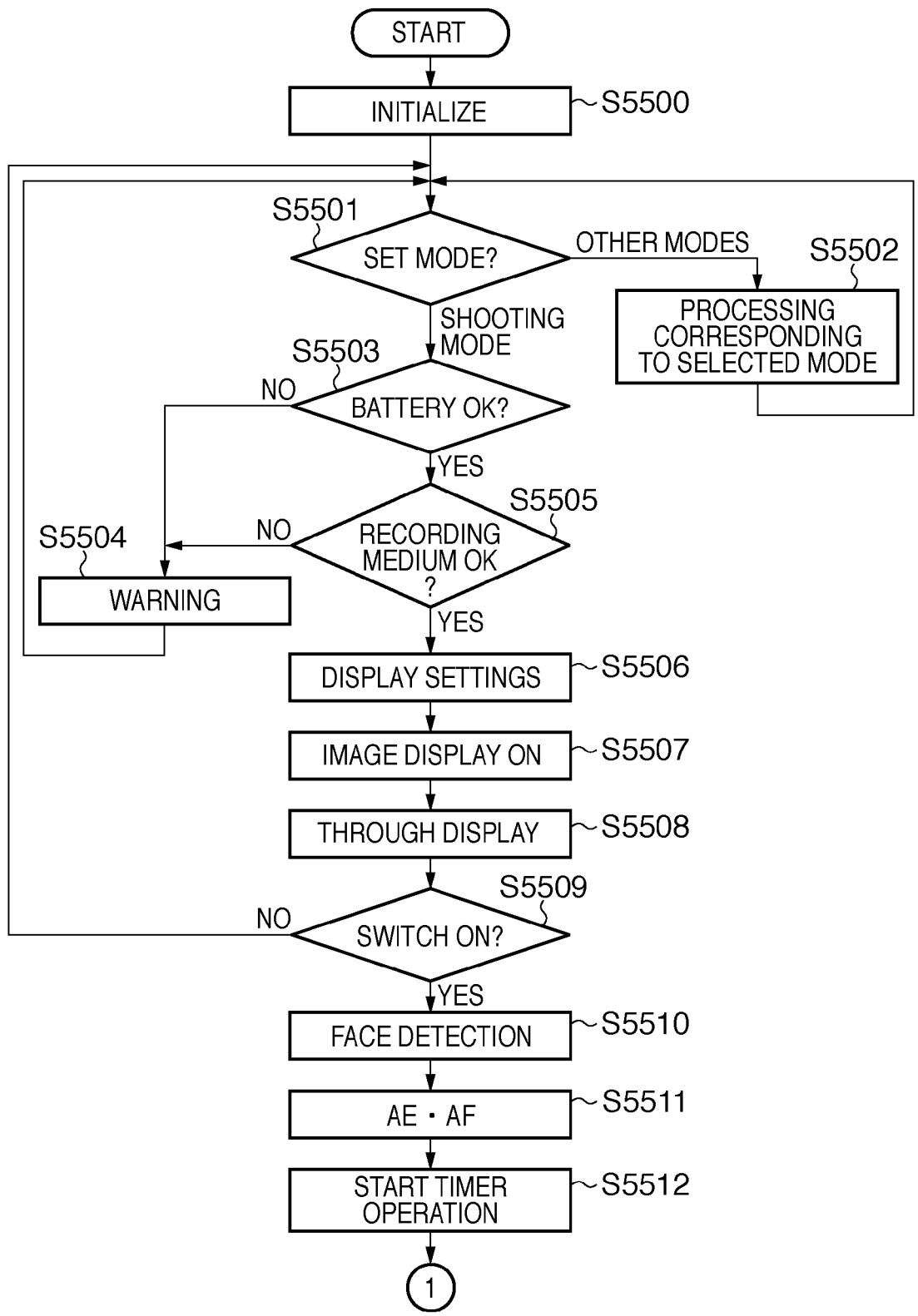

The operation of the image-capture device according to this embodiment will be described with reference to the flowchart in FIGS. 17A-B. This process starts upon power-on. First, in step S5500, the system control circuit 5009 initializes various flags and control variables in the internal memory. In step S5501, the system control circuit 5009 detects the mode set state of the image-capture device. If a mode other than a shooting mode is set, the process advances to step S5502. In step S5502, the system control circuit 5009 executes a process corresponding to the selected mode. When the process has finished, the process returns to step S5501. In this case, a facial expression that should trigger shooting can also be set. In this embodiment, "smiling face" is selected from the facial expressions.

If an automatic shooting mode is set in step S5501, the process advances to step S5503. The system control circuit 5009 determines whether the remaining power supply level or the operation state has a problem in the operation of the image-capture device. If the system control circuit 5009 determines that there is a problem, the process advances to step S5504 to cause the display device 5013 to output a predetermined warning by an image or sound. Then, the process returns to step S5501.

If the system control circuit 5009 determines in step S5503 that the power supply has no problem, the process advances to step S5505. In step S5505, the system control circuit 5009 determines whether the operation state of the storage medium has a problem in the operation of the image-capture device and, more particularly, in the image data recording/playback operation for the storage medium. If the system control circuit 5009 determines that there is a problem, the process advances to step S5504 to cause the display device 5013 to output a predetermined warning by an image or sound. Then, the process returns to step S5501.

If the system control circuit 5009 determines in step S5505 that the storage medium has no problem, the process advances to step S5506. In step S5506, the system control circuit 5009 causes the display device 5013 to display a user interface (to be referred to as a "UI" hereinafter) of various setting states of the image-capture device using an image or sound. When the image display of the display device 5013 is ON, the UI of various setting states of the image-capture device may be displayed using the display device 5013 by an image or sound. In this way, the user executes various settings.

In step S5507, the system control circuit 5009 turns on the image display of the display device 5013. In step S5508, the system control circuit 5009 sets a through display state to sequentially display captured image data. In the through display state, data sequentially written in the memory 5007 are sequentially displayed on the display device 5013, thereby implementing the electronic viewfinder function.

In step S5509, the system control circuit 5009 determines whether the user such as a photographer has pressed the shutter switch. If the user has not pressed the shutter switch, the process returns to step S5501. If the user has pressed the shutter switch, the system control circuit 5009 executes face detection processing in step S5510. The face detection processing is implemented by the same processing as in the first embodiment.

In step S5511, AE and AF are performed in accordance with the face detected in step S5510. In step S5512, measurement of the time that has elapsed from switch ON in step S5509 starts.

In step S5513, the display device 5013 displays not only the captured image data but also the position of the face detected in step S5510.

In step S5514, personal authentication is executed for each face detected in step S5510. The personal authentication adopts, for example, a mutual subspace method in reference [5], or a method of segmenting a face region into a plurality of sub-regions and performing comparison of each sub-region, as in reference [6]. In this embodiment, the method of reference [6], that is, the method of segmenting a face region into a plurality of sub-regions is used. The images to be used for authentication need not always be registered in advance and may be registered immediately before shooting. The personal authentication method is not limited to that described in this embodiment.

In step S5515, smiling face recognition is executed for only a specific person authenticated in step S5514. The smiling face recognition is done based on the difference from expressionless data prepared in advance, as in reference [7]. The facial expression recognition method is not limited to that described in this embodiment.

In step S5516, the system control circuit 5009 determines whether a predetermined shooting condition is satisfied. For example, when a smiling face shooting mode is set in step S5501, the system control circuit 5009 determines whether the facial expression determined in step S5515 is "smiling face". If it is determined in step S5516 that the predetermined shooting condition is satisfied, that is, the facial expression of a predetermined person in the image is "smiling face", the process advances to step S5517.

In step S5517, shooting is performed. In step S5518, the display device 5013 displays the captured image. In step S5519, the captured image is stored in, for example, a CF (Compact Flash) via the interface 5008.

In storing the captured image in the CF (Compact Flash), the parameters (e.g., facial expression determination threshold value) used in the facial expression recognition processing, the facial expression recognition result, and the personal authentication ID are recorded in addition to information such as the image size of the captured image. For example, a parameter (e.g., facial expression determination threshold value) or a personal authentication ID used in the facial expression recognition process is recorded in Exif information. When the parameters used in the facial expression recognition processing, the facial expression recognition result, and the personal authentication ID are recorded together with the captured image, it is possible to quickly find an image of a person A who is making a specific facial expression from an enormous number of images stored in, for example, a hard disk. For an image without the facial expression recognition result, images of the same person for which the parameters used in facial expression recognition are recorded are searched for preferentially. Then, facial expression recognition may be executed for the image without the facial expression recognition result using the recorded parameters.

If it is determined in step S5516 that the predetermined shooting condition is not satisfied, the process advances to step S5521. In step S5521, the system control circuit 5009 confirms whether a predetermined time t2 [s] has elapsed from the start of the timer operation in step S5512. If it is confirmed in step S5521 that the predetermined time t2 [s] has elapsed, the process advances to step S5522. The predetermined time t2 [s] may be set for each person or each facial expression in advance. In step S5522, the system control circuit 5009 confirms whether the shooting operation has been performed.

If the shooting operation has not been performed at all in step S5522, the system control circuit 5009 determines that the current facial expression determination threshold value is not optimum. The process advances to step S5523. In step S5523, the facial expression determination threshold value is changed from Th3 to Th3', and the process advances to step S5520.

Figure 18:
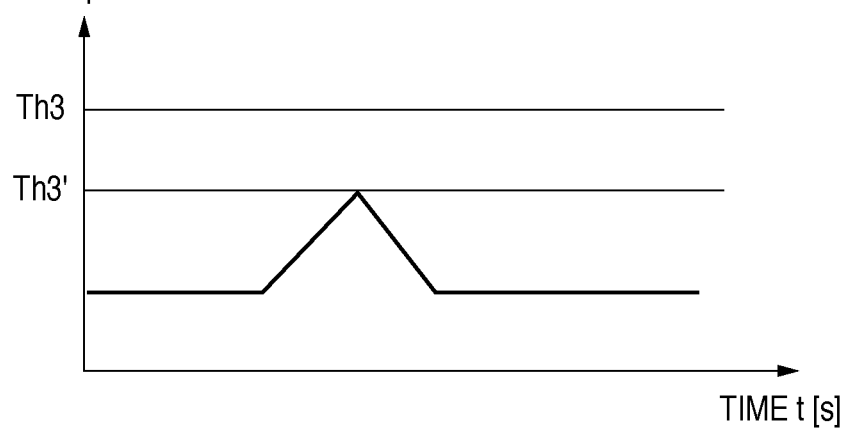
FIG. 18 is a graph for explaining a change in a threshold value for a facial expression evaluation value according to the third embodiment.

If the user selects the smiling face shooting mode in step S5501, the subject smiles once a predetermined time at a high possibility after switch ON in step S5509. Hence, to change the facial expression determination threshold value Th3 to Th3', as shown in, for example, FIG. 18, a maximum value Exp2max and a minimum value Exp2min of a facial expression evaluation value Exp2 within a predetermined time are calculated, and the maximum value Exp2max is set as the facial expression determination threshold value Th3'.

As for an "eye closing" facial expression, a human being generally blinks once in 3 to 10 sec. Hence, the threshold value Th3 is set such that the eye closed state is determined at least twice when predetermined time t2=20 [s].

For more accurate facial expression recognition, the facial expression evaluation value calculation formula, its coefficient, or the threshold value used for feature extraction may be changed, as described in the first and second embodiments.

If it is determined in step S5521 that the predetermined time t2 [s] has not elapsed from the start of the timer operation in step S5512, the process advances to step S5520. Similarly, if it is determined in step S5522 that the shooting operation has been executed a predetermined number of times or more or a predetermined number of times or less, the process advances to step S5520.

If the automatic shooting has finished in step S5520, the process is ended. Otherwise, the process advances to step S5524. In step S5524, face detection processing is executed for the next frame image. Then, the process returns to personal authentication processing in step S5514.

As described above, when the facial expression determination threshold value is changed, it is possible to detect even the facial expression of a person whose facial parts such as the eyes and mouth change their shapes only in a small amount.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention can be implemented by a computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a storage medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-173112, filed Jun. 29, 2007, which is hereby incorporated by reference herein in its entirety.

What is claimed is:

1. An image-processing apparatus comprising:
    a face region extraction unit configured to extract face regions of a person from input images;
    a calculation unit configured to calculate facial expression evaluation values from the extracted face regions using an evaluation formula;
    a determination unit configured to determine facial expressions represented by the face regions based on the calculated facial expression evaluation values;
    a measurement unit configured to measure a time series change in the calculated facial expression evaluation values corresponding to a plurality of the images input during a predetermined time period; and
    a change unit configured to change, in a case that a difference between a maximum value and a minimum value of the calculated facial expression evaluation values calculated during the predetermined time period is smaller than a predetermined value, one of the evaluation formula and a parameter of the evaluation formula to increase the difference.

2. The apparatus according to claim 1, wherein said change unit changes one of the evaluation formula and the parameter of the evaluation formula to make the maximum value and the minimum value of the calculated facial expression evaluation values take predetermined values.

3. The apparatus according to claim 1, further comprising a partial region extraction unit configured to extract, from the extracted face regions, a predetermined partial region in which the facial expression changes between a first state and a second state,
    wherein said calculation unit calculates the facial expression evaluation values using, for the extracted partial region, an evaluation formula which yields a first value in a case that the facial expression indicates a likelihood of the occurrence of the second state and a second value, smaller than the first value, in a case that the facial expression indicates a likelihood of the occurrence of the first state, and
    wherein said determination unit determines that the facial expression indicates the second state in a case that the calculated facial expression evaluation value exceeds a threshold value.

4. The apparatus according to claim 3, wherein said calculation unit has a neural network whose neuron output value becomes larger in the second state than in the first state, and the evaluation formula represents a relationship between the facial expression evaluation value and the number of neuron output values not less than a threshold value in the neuron output values of pixels of the partial region.

5. The apparatus according to claim 4, wherein the relationship between the facial expression evaluation value and the number of neuron output values not less than the threshold value in the neuron output values of the pixels of the partial region is represented by a hyperbolic tangent function.

6. The apparatus according to claim 4, wherein said change unit changes the threshold value as the parameter.

7. The apparatus according to claim 3, wherein
the predetermined partial region is a pupil region,
the first state is an eye open state, and
the second state is an eye closed state.

8. An image-processing method comprising:
extracting face regions of a person from input images;
calculating facial expression evaluation values from the extracted face regions using an evaluation formula;
determining facial expressions represented by the face regions based on the calculated facial expression evaluation values;
measuring a time series change in the calculated facial expression evaluation values corresponding to a plurality of the images input during a predetermined time period; and
in a case that a difference between a maximum value and a minimum value of the calculated facial expression evaluation values calculated during the predetermined time period is smaller than a predetermined value, changing one of the evaluation formula and a parameter of the evaluation formula to increase the difference.

9. A non-transitory computer-readable storage medium which stores a program for causing an image-processing apparatus to:
extract face regions of a person from input images;
calculate facial expression evaluation values from the extracted face regions using an evaluation formula;
determine facial expressions represented by the face regions based on the calculated facial expression evaluation values;
measure a time series change in the calculated facial expression evaluation values corresponding to a plurality of the images input during a predetermined time period; and
in a case that a difference between a maximum value and a minimum value of the calculated facial expression evaluation values calculated during the predetermined time period is smaller than a predetermined value, change one of the evaluation formula and a parameter of the evaluation formula to increase the difference.

10. An image-processing apparatus comprising:
face region extraction means for extracting face regions of a person from input images;
calculation means for calculating facial expression evaluation values from the extracted face regions using an evaluation formula;
determination means for determining facial expressions represented by the face regions based on the calculated facial expression evaluation values;
measuring means for measuring a time series change in the calculated facial expression evaluation values corresponding to a plurality of images input during a predetermined time period; and
change means for, in a case that a difference between a maximum value and a minimum value of the calculated facial expression evaluation values calculated during the predetermined time period is smaller than a predetermined value, changing one of the evaluation formula and a parameter of the evaluation formula to increase the difference.

* * * * *